United States Patent [19]

Takenaka et al.

[11] 4,328,086
[45] May 4, 1982

[54] METHOD FOR THE MANUFACTURE OF ION-EXCHANGE MEMBRANE-CATALYTIC METAL COMPOSITE

[75] Inventors: Hiroyasu Takenaka, Ikeda; Eiichi Torikai, Yao, both of Japan

[73] Assignee: Agency of Industrial Science & Technology, Tokyo, Japan

[21] Appl. No.: 178,627

[22] Filed: Aug. 15, 1980

[30] Foreign Application Priority Data

Oct. 30, 1979 [JP] Japan ................................ 54-140739

[51] Int. Cl.³ .............................................. C25B 13/02
[52] U.S. Cl. .................................... 204/296; 204/282; 204/301; 429/41; 429/247
[58] Field of Search ............... 204/301, 296, 282, 283, 204/301; 429/247, 248, 249, 41, 42; 521/27, 50, 53, 57

[56] References Cited

U.S. PATENT DOCUMENTS

| | | | |
|---|---|---|---|
| 3,775,308 | 11/1973 | Yasuda | 204/296 X |
| 4,111,866 | 9/1978 | Torikai et al. | 204/296 X |
| 4,126,536 | 11/1978 | Balko et al | 204/296 |
| 4,135,996 | 1/1979 | Bouy et al. | 204/252 X |
| 4,170,537 | 10/1979 | Simmons | 204/296 X |
| 4,170,539 | 10/1979 | Simmons | 521/27 X |

OTHER PUBLICATIONS

Kissel et al, "Hydrogen Production by Water Electrolysis Method for Approaching Ideal Efficiencies", *IECEC*, 1975 Record, pp. 1194-1198.

*Primary Examiner*—F. Edmundson
*Attorney, Agent, or Firm*—Armstrong, Nikaido, Marmelstein & Kubovcik

[57] ABSTRACT

Disclosed is a method for the manufacture of an ion-exchange membrane—catalytic metal composite, which comprises treating the surface of an ion-exchange membrane with a low-temperature gas plasma to thereby form micropores on the membrane surface, and with or without subjecting the ion-exchange membrane to a hydrothermal treatment at 100°–200° C., then attaching a catalytic metal onto the ion-exchange membrane.

8 Claims, 1 Drawing Figure

METHOD FOR THE MANUFACTURE OF ION-EXCHANGE MEMBRANE-CATALYTIC METAL COMPOSITE

BACKGROUND OF THE INVENTION

The present invention relates to a method for the manufacture of a composite of an ion-exchange membrane and a catalytic metal having a strong adhesive property between the ion-exchange membrane and the catalytic metal (electrode) and a low contact resistance.

Composites comprising an ion-exchange membrane and a catalytic metal (hereinafter abridged simply as I-C composites) have been conventionally utilized in water electrolysis, brine electrolysis, hydrochloric acid electrolysis, fuel cells and so forth in which use is made of a solid polymer electrolyte (hereinafter referred to simply as SPE).

In the art of such electrolysis, it has been a matter of a particular importance to improve the adhesive property between the ion-exchange membrane and the catalytic metal in order to have the voltage required for electrolysis or decomposition reduced and the energy efficiency enhanced. That is to say, if insufficient is the adhesive strength between the ion-exchange membrane and the catalytic metal, this leads disadvantageous results such as a rise in the electrolysis voltage due to a high contact resistance present across the attached surfaces of the membrane and the metal, a peeling of the catalyst metal off the membrane, and so forth.

For the manufacture of I-C composites, methods are known, for example such a one as disclosed in Japanese Patent Laid-Open Publication No. 52-78788, in which catalytic powder is attached onto a membrane under a high pressure and at a high temperature with use of a binder such as Teflon for example, and a one as shown in Japanese Patent Publication No. 42-5014 and Japanese Patent Laid-Open Publication No. 55-38934, in which a catalytic metal is directly deposited on a membrane with use of a reducing agent and a metal salt solution.

With the composites manufactured according to those methods, however, the adhesion between the ion-exchange membrane and the catalytic metal does not comprise a chemical adhesion but comprises a physical one based on the van der Walls force for example, and generally the compsites have only a poor adhesive property and, as before mentioned, show a high contact resistance, making an accordingly high electrolysis voltage required.

SUMMARY OF THE INVENTION

The present invention seeks to eliminate difficulties as above indicated in connection with the conventional art, by considerably increasing the surface area of the ion-exchange membrane and improving the anchoring of the metal into the membrane, and it contemplates to provide a composite of an ion-exchange membrane and a catalytic metal having a strong adhesive property, for use in SPE water electrolysis, SPE brine electrolysis, SPE hydrochloric acid electrolysis and so forth, by way of intensifying with a leap the strength of adhesion between the catalytic metal and the ion-exchange membrane and diminishing the contact resistance across the joined surfaces of the membrane and the metal.

To attain such objects, the present invention proposes to subject an ion-exchange membrane to a surface treatment with low-temperature gas plasma to thereby let micropores be formed on the membrane surface, and with or without a hydrothermal treatment further operated of the membrane, let a catalytic metal be deposited on the surface of the membrane. Micropores formed on the membrane surface can effectively conduce to promote the anchoring of the catalytic metal and enhance the adhesive strength between the ion-exchange membrane and the catalytic metal, whereby a suppression can be realized of the contact resistance at the time when the product composite is put for use for electrolysis.

DETAILED DESCRIPTION OF THE INVENTION

Strictly speaking, the low-temperature gas plasma treatment of the surface of an ion-exchange membrane according to the present invention may be various depending upon given particulars concerning the kind, pressure, feed rate, stay time and so on of the gas. However, it may be operated under conditions substantially the same as those normally employed in plasma etching and by suitably adjusting the radio-frequency power and the time of the treatment, to have innumerable micropores formed on the surface of the membrane, making the membrane surface roughened. Thereafter, it may be operated in accord with the present invention to have a catalytic metal deposited on the membrane surface.

Also, effects of the surface treatment with a gas plasma vary depending on kinds of the ion-exchange membrane, and the treatment should necessarily be operated taking into account the kind of the ion-exchange membrane. For example, where use is made of "Nafion" products (copolymers of sulfonyl fluoride vinyl ether and tetrafluoroethylene, products of du Pont Company, U.S.A.) which have a skelton structure similar to that of polytetrafluoroethylene (PTFE), the etching rates are in the following order: Nafion 110 (EW=1100)>Nafion 120≈Nafion 125 (EW=1200)>PTFE, wherein EW (equivalent weight) represents the gram number of the membrane required in neutralizing one equivalent weight of an alkali.

From the above, it will be understood that the plasma surface treatment can proceed in a shorter time with an ion-exchange membrane having a greater ion-exchange capacity. Whereas the etching rate is represented in terms of the rate of weight reduction of the ion-exchange membrane, the weight reduction has a straight linear relationship with the treatment time, and the etching rate is represented by the inclination of the straight line, $(g/cm^2 \cdot hr)$.

For example, influences of the radio-frequency power on the etching rate in the treatment of Nafion 125 membrane with oxygen gas plasma are as shown in the following Table 1.

TABLE 1

| Radio-frequency Power (W) | Etching Rate $(g/cm^2 \cdot hr)$ |
| --- | --- |
| 300 | $0.6 \times 10^{-3}$ |
| 200 | $0.4 \times 10^{-3}$ |

TABLE 1-continued

| Radio-frequency Power (W) | Etching Rate (g/cm². hr) |
| --- | --- |
| 100 | 0.2 × 10⁻³ |

The above Table 1 clearly shows that the higher the radio frequency power is, the higher is the etching rate.

Figure 1:
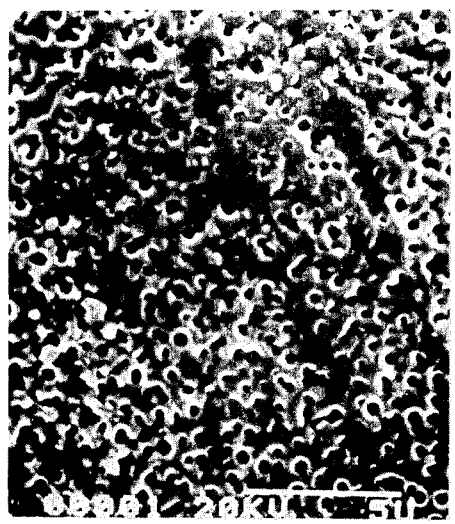
FIGS. 1 and 2 comprise scanning electron micrographs, respectively showing the surface of an ion-exchange membrane subjected to a surface treatment with a low-temperature gas plasma.
Figure 2:
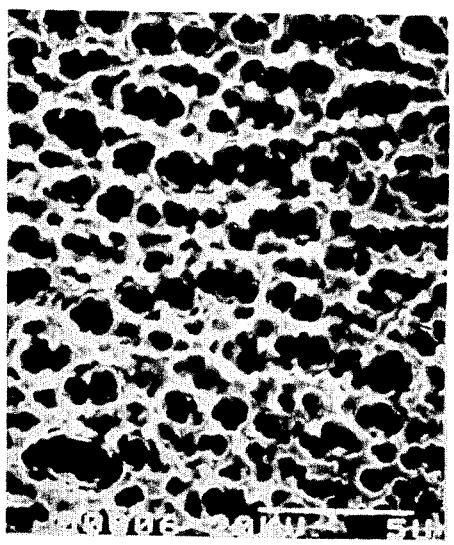

Then, the relationship between the treatment time and the micropores formed on the surface of an ion-exchange membrane is shown in FIGS. 1 and 2, which are scanning electron micrographs of the surface of Nafion 125 membrane treated with oxygen gas plasma at the radio-frequency power of 300 W and show that innumerable micropores are formed three-dimensionally on the membrane surface. From comparing FIG. 1 (treatment time, 0.5 hr) with FIG. 2 (treatment time, 2 hr), it may be perceived that both pore size (0.5–3μ) and etching depth (0.5–3.5μ) increase proportional to the treatment time.

Now, for the ion-exchange membranes used in the present invention, preferred are fluorine resin ion-exchange membranes used in various SPE elctrolysis processes, for example the aforementioned "Nafion". However, the membrane are not limited only thereto, and any other membrane may be effectively employed according to the present invention insofar as it does not undergo a property degradation when subjected to a low-temperature gas plasma treatment.

As for the low temperature gas plasma used in the present invention, use may be suitably made of any of oxidizing gases and inert gases such as oxygen, air, nitrogen, helium and so forth as well as a mixture of them. Treatment with low-temperature plasma of such gases virtually does not adversely affect properties of ion-exchange membranes: For instance, the water content in the membrane can remain substantially unchanged and the membrane resistance in an electrolyte solution can tends to decrease as the etching proceeds.

Nafion 125 membranes were subjected to surface treatment at the radio-frequency power of 300 W, and the following Table 2 shows the relationship then found of the treatment time and the effective resistance [the effective resistance value means the electric resistance value of the membrane in 1 N $H_2SO_4$ solution (25° C.)]:

TABLE 2

| Treatment Time (min) | Effective Resistance (Ω . cm²) |
| --- | --- |
| 30 | 0.25 |
| 60 | 0.23 |
| 90 | 0.22 |
| 180 | 0.19 |

As considered above, by operating a low-temperature gas plasma treatment of ion-exchange membranes, it is feasible to form a porous structure on the membrane surface without impairing the function of the ion-exchange membrane, and subsequent to such plasma treatment operation, it may be carried out to attach or deposit the prescribed catalytic metal on the surface of the ion-exchange membrane.

To deposit the catalytic metal, any suitable method may be relied on, for example the aforementioned one in which use is made of a binder for example Teflon or the one in which reducing agent and a metal salt solution are sued and the metal is deposited on the membrane surface.

By subjecting ion-exchange membranes to a hydrothermal treatment, it also is feasible to improve the adhesive property between the membrane and the catalytic metal and decrease the membrane resistance. The hydrothermal treatment may be carried out normally at a temperature within the range of 100°–200° C. However, if it is treated at a high temperature, the membrane tends to undergo an extreme swelling and lower its mechanical strength, and the treatment is to be carried out within a preferred temperature range of from 100° to 160° C. in an autoclave. A treatment time of about one hour will be sufficient.

Relationships between the hydrothermal treatment temperature and the water content and also the effective resistance of the ion-exchange membrane are shown in Table 3 below.

TABLE 3

| Treatment Temperature (°C.) | Water Content (%) | Effective Resistance (Ω . cm²) |
| --- | --- | --- |
| 100 | 20 | 0.26 |
| 130 | 30 | 0.24 |
| 150 | 40 | 0.19 |
| 180 | 70 | 0.16 |
| 200 | 130 | 0.13 |

As clearly seen from the above Table 3, the membrane increasingly swells and the water content increases as the treatment temperature is higher, and the membrane retains the water content values even at room temperature.

Also, as the treatment temperature is higher, the effective resistance value decreases, and the dimensional stability of the membrane against a temperature change becomes improved. Further, on account of the hydrothermal treatment, the wetting of the surface of the membrane becomes improved as well as the adhesive property between the membrane and the catalytic metal. At a treatment temperature below 100° C., it tends to occur that the deposited metal becomes peeled off the membrane surface, and a treatment temperature above 200° C. is not preferred in view of a limited heat resistivity of fluorine resin ion-exchange membranes.

Although the effects of the present invention can be obtained even by effecting only a treatment with a gas plasma, it is more preferred to operate in combination such plasma treatment and the above described hydrothermal treatment to further improve the adhesive property between the ion-exchange membrane and the catalytic metal and also to further lower the contact resistance.

The operation sequence of the gas plasma treatment and the hydrothermal treatment is not particularly limited. However, taking into consideration that under a dry condition, the effect of the hydrothermal treatment is lost, it is preferred to effect the gas plasma treatment first, followed by the hydrothermal treatment.

Catalytic metals employable for the practice of the present invention may comprise any of Pt, Rh, Ru, Ir, Pd and their alloys.

EXAMPLE

Nafion 125 membranes were treated with oxygen gas plasma for varied periods of time within the range of 1 to 3 hr at the ratio frequency power of 300 W, and then subjected to a hydrothermal treatment at 100° C. for 1 hr. With use of a 3% chloroplatinic acid solution for a metal salt source and a 1% NaBH$_4$ solution for a reducing agent, and in accordance with a method in which the reducing agent is penetrated from a rear side of a membrane and a platinum layer is formed on the membrane surface at the side of the chloroplatinic acid solution, a platinum catalyst layer was deposited on both surfaces of the above pretreated membranes. Then, using the composites then obtained, a water electrolysis was conducted at 25° C. The relationship then found between the internal resistance value and the time of the low-temperature gas plasma treatment is shown in Table 4 below.

TABLE 4

| Experiment No. | Plasma Treatment Time (min) | Internal Resistance ($\Omega \cdot cm^2$) |
|---|---|---|
| 1 | 0 | 0.29 |
| 2 | 60 | 0.28 |
| 3 | 120 | 0.27 |
| 4 | 180 | 0.26 |

The internal resistance value at the time of water eletrolysis is an aggregate of values of such as membrane resistance, contact resistance across the membrane and catalyst electrode and lead resistance, and it therefore can constitute a criterion for telling the adhesive property.

That is to say, as the adhesive property is poorer, the contact resistance is greater and the internal resistance is extremely higher.

It is apparent from the Table 4 above that, as compared with the result of Experiment No. 1 wherein hydrothermal treatment alone was operated with the plasma treatment omitted, the internal resistance values are lower in the case of Experiments Nos. 2–4 wherein both plasma treatment and hydrothermal treatment were conducted. This shows that the adhesive property between the Nafion membrane and the platinum catalyst layer was improved in the cases of Experiments Nos. 2–4.

Also, it was observed that the catalyst layer was not peeled off the membrane surface at all even after electrolytic tests carried out under a high current density above 50 A/dm$^2$ for longer than several hundred hours. Thus, the adhesive property was extremely firm.

According to such method of the present invention, innumerable micropores can be formed on the surface of the ion-exchange membrane as shown in FIGS. 1 and 2 by the treatment with a low-temperature gas plasma. Micropores formed on the membrane surface serve to promote the penetration or anchoring of the catalytic metal for its adhesion onto the ion-exchange membrane.

Further, the ion-exchange membrane can be then made to have a surface area larger than the geometrical surface area thereof, and as a result, the adhesive strength between the catalytic metal and the membrane can be enhanced with a leap and a peeling of the catalytic metal layer likely during a long time use of the composite can be effectively prevented from occurring.

In addition, by the hydrothermal treatment of the ion-exchange membrane, if made, the contact resistance can be lowered and the wettability of the surface of the ion-exchange membrane can be improved owing to an increase in the water content. Consequently, the adhesive property between the membrane and the catalytic metal can further be enhanced. Thus, by employing in combination the treatment with a low-temperature gas plasma and the hydrothermal treatment, it is feasible to obtain a compsite having a further improved adhesive property and having only a low contact resistance.

What is claimed is:

1. A method of manufacturing a compsite of an ion-exchange membrane and a catalytic metal by attaching a catalytic metal onto an ion-exchange membrane, which comprises the steps of treating the surface of the ion-exchange membrane with a low temperature gas plasma to thereby form micropores on the membrane surface, and then attaching the catalytic metal onto the ion-exchange membrane.

2. The method according to claim 1, wherein the ion-exchange membrane is subjected to a hydrothermal treatment at 100°–200° C. prior to attaching the catalytic metal onto the ion-exchange membrane.

3. The method according to claim 2, wherein the hydrothermal treatment is effected following to the plasma treatment.

4. The method according to claim 1, wherein the adhesion is effected with use of a reducing agent and a metal salt solution and by depositing the catalytic metal on the ion-exchange membrane.

5. The method according to claim 1, wherein the ion-exchange membrane comprises a fluorine synthetic resin membrane.

6. The method according to claim 1, wherein the metal is selected from the group consisting of Pt, Rh, Ru, Ir, Pd and their alloys.

7. The method according to claim 1, wherein the gas used for the plasma treatment is selected from the class consisting of oxygen, air, helium and nitrogen.

8. The method according to claim 2, wherein the hydrothermal treatment is carried out at a temperature within the range of from 100° to 160° C.

* * * * *